United States Patent
Choi

(10) Patent No.: US 9,931,925 B2
(45) Date of Patent: Apr. 3, 2018

(54) SYSTEM FOR CONTROLLING AIR FLAP OF VEHICLE

(71) Applicant: Hyundai Motor Company, Seoul (KR)

(72) Inventor: Seung Ho Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 117 days.

(21) Appl. No.: 15/205,140

(22) Filed: Jul. 8, 2016

(65) Prior Publication Data

US 2017/0151866 A1   Jun. 1, 2017

(30) Foreign Application Priority Data

Dec. 1, 2015  (KR) .................. 10-2015-0169670

(51) Int. Cl.
- *B60K 11/08* (2006.01)
- *G01S 19/42* (2010.01)
- *G01S 19/14* (2010.01)

(52) U.S. Cl.
CPC ............ *B60K 11/085* (2013.01); *G01S 19/42* (2013.01); *G01S 19/14* (2013.01); *Y02T 10/88* (2013.01)

(58) Field of Classification Search
CPC ....... B60K 11/085; G01S 19/42; G01S 19/14; Y02T 10/88
USPC .......................................................... 701/49
See application file for complete search history.

(56) References Cited

U.S. PATENT DOCUMENTS

| | | | | |
|---|---|---|---|---|
| 5,992,162 A * | 11/1999 | Heinle | ............... | B60H 1/00785 15/250.001 |
| 2011/0160958 A1* | 6/2011 | Shiroyama | ........... | B60H 1/0075 701/36 |
| 2014/0116181 A1* | 5/2014 | Yamada | ............... | B60H 1/0065 74/480 R |
| 2014/0124161 A1* | 5/2014 | Han | ................... | B60H 1/00335 165/42 |
| 2014/0305626 A1* | 10/2014 | Jange | ................. | B60H 1/00828 165/204 |
| 2016/0176264 A1* | 6/2016 | Jablonski | ............. | B60H 1/0065 165/203 |

FOREIGN PATENT DOCUMENTS

| | | |
|---|---|---|
| JP | 2003-276454 A | 9/2003 |
| KR | 10-2008-0019324 A | 3/2008 |
| KR | 10-2011-0026845 A | 3/2011 |
| KR | 2011-0132924 A | 12/2011 |
| KR | 2013-0062148 A | 6/2013 |
| KR | 2014-0032620 A | 3/2014 |
| KR | 2015-0071224 A | 6/2015 |
| KR | 10-1556585 B1 | 10/2015 |

\* cited by examiner

*Primary Examiner* — Jaime Figueroa
(74) *Attorney, Agent, or Firm* — Mintz Levin Cohn Ferris Glovsky and Popeo, P.C.; Peter F. Corless

(57) ABSTRACT

A system for controlling an air flap of a vehicle such as a commercial bus is intended to control an opening degree amount of an air flap installed for cooling an engine mounted in the vehicle. The system controls an open amount of the air flap when the vehicle enters a specified stop section such as a bus stop of a bus service route, so that the transmission of hot air and noise of the engine to pedestrians is minimized.

7 Claims, 4 Drawing Sheets

| location information | entering stop section | not entering stop section |
|---|---|---|
| opening degree amount of air flap | 50 | 100 |
| open amount [conversion] | 50% OPEN | 100% OPEN |

| pedestrian information | existence of pedestrian | absence of pedestrian |
|---|---|---|
| opening degree amount of air flap | 0 | 50 |
| open amount [conversion] | FULL OPEN | 50% OPEN |

| coolant temperature[°C] | 50 | 55 | 60 | 65 | 70 | 75 | 80 | 85 | 90 | 95 | 100 | 105 | 110 |
|---|---|---|---|---|---|---|---|---|---|---|---|---|---|
| opening degree amount of air flap | 0 | 0 | 0 | 70 | 75 | 80 | 85 | 90 | 95 | 100 | 100 | 100 | 100 |
| open amount [conversion] | FULL CLOSED | FULL CLOSED | FULL CLOSED | 70% OPEN | 75% OPEN | 80% OPEN | 85% OPEN | 90% OPEN | 95% OPEN | FULL OPEN | FULL OPEN | FULL OPEN | FULL OPEN |

FIG. 4

| vehicle speed[KPH] | 0 | 10 | 20 | 30 | 40 | 50 | 60 | 70 | 80 |
|---|---|---|---|---|---|---|---|---|---|
| opening degree amount of air flap | 0 | 0 | 0 | 25 | 50 | 75 | 100 | 100 | 100 |
| open amount [conversion] | FULL CLOSED | FULL CLOSED | FULL CLOSED | 25% OPEN | 50% OPEN | 75% OPEN | FULL OPEN | FULL OPEN | FULL OPEN |

FIG. 5

| ambient air temperature[°C] | -10 | -5 | 0 | 5 | 10 | 15 | 20 | 25 | 30 |
|---|---|---|---|---|---|---|---|---|---|
| opening degree amount of air flap | 0 | 0 | 0 | 50 | 100 | 100 | 100 | 100 | 100 |
| open amount [conversion] | FULL CLOSED | FULL CLOSED | FULL CLOSED | 50% OPEN | FULL OPEN | FULL OPEN | FULL OPEN | FULL OPEN | FULL OPEN |

FIG. 6

| intake air temperature[°C] | -10 | -5 | 0 | 5 | 10 | 15 | 20 | 25 | 30 |
|---|---|---|---|---|---|---|---|---|---|
| opening degree amount of air flap | 0 | 0 | 0 | 50 | 100 | 100 | 100 | 100 | 100 |
| open amount [conversion] | FULL CLOSED | FULL CLOSED | FULL CLOSED | 50% OPEN | FULL OPEN | FULL OPEN | FULL OPEN | FULL OPEN | FULL OPEN |

FIG. 7

| location information | entering downtown travel section | not entering downtown travel section |
|---|---|---|
| opening degree amount of air flap | 50 | 100 |
| open amount [conversion] | 50% OPEN | 100% OPEN |

FIG. 8

SYSTEM FOR CONTROLLING AIR FLAP OF VEHICLE

CROSS-REFERENCE TO RELATED APPLICATION

This application claims under 35 U.S.C. § 119(a) the benefit of Korean Patent Application No. 10-2015-0169670 filed on Dec. 1, 2015, the entire contents of which are incorporated herein by reference.

BACKGROUND (a) Technical Field

The present invention relates to a system for controlling an air flap of a vehicle such as a commercial bus, and more particularly, to a system for controlling an air flap of a commercial bus that is intended to control an opening degree amount of an air flap (i.e., an amount or percentage the air flap is opened as compared to a fully closed state) installed for cooling an engine mounted in the commercial bus.

(b) Description of the Related Art

In general, an air flap for ambient air inflow and indoor air outflow is provided at a lateral side of vehicle bodies of vehicles such as commercial buses in order to cool an engine mounted in an engine room of a corresponding vehicle.

The air flap can be formed in an open structure of a rotatable vane or a punching hole, and exposed to the outside from a lateral side of a vehicle body so that hot air and noise in the engine room flow out and are in turn transmitted to the outside of the vehicle. Accordingly, as complaints of bus users and pedestrians about such a vehicle has been growing, it is desirable to take measures to address the complaints.

The above information disclosed in this Background section is only for enhancement of understanding of the background of the invention and therefore it may contain information that does not form the prior art that is already known in this country to a person of ordinary skill in the art.

SUMMARY

An object of the present invention is to provide a system for controlling an air flap of a vehicle (e.g., a commercial bus), which controls an opening degree of the air flap of the vehicle and thus an amount by which the air flap is opened when the vehicle enters a specified stop section such as a bus stop of a bus service route, so that the transmission of hot air and noise of the engine to pedestrians is minimized, thereby protecting the pedestrians. As used herein, the term "stop section" refers to a bus stop (e.g., a destination) or other designated area at which a vehicle stops in accordance with a predetermined route of the vehicle, and which is typically arranged in advance in accordance with a map.

In one aspect, the present invention provides a system for controlling an air flap of a vehicle, characterized in that the system comprises a GPS (Global Positioning System) receiver for receiving GPS signals; a data storage unit which stores map information of stop sections fixed in accordance with a specified travel route of the vehicle; and an electronic control unit for determining whether or not the vehicle enters a stop section based on vehicle location information detected from GPS signals and the map information in the data storage unit and controlling an opening degree amount of an air flap in consideration of an opening degree amount which is set depending on whether or not the vehicle enters the stop section.

In a preferred embodiment of the present invention, the system for controlling an air flap of a vehicle further comprises an imaging means for providing image information regarding whether or not a pedestrian is present at the stop section of the vehicle, and the electronic control unit controls the opening degree amount of the air flap in consideration of an opening degree amount which is set depending on existence or absence of a pedestrian detected from the image information of the imaging means.

Preferably, if the electronic control unit determines that the vehicle enters the stop section, it fixes the order of priority of parameters for determining the opening degree amount of the air flap in the order of engine coolant temperature, vehicle speed, and then existence or absence of a pedestrian at the stop section.

In addition, preferably, the data storage unit stores map information of stop sections and also map information of a downtown travel section and the electronic control unit determines whether or not the vehicle enters the downtown travel section based on the vehicle location information and the map information in the data storage unit.

As used herein, the term "downtown travel section" refers to a travel section involving bus stops where it is found that there are relatively a large number of pedestrians among bus stops (i.e., stop sections) of the related bus travel route. In particular, a downtown travel section may be a relatively congested portion of the bus travel route, as distinguished from other, less busy portions.

For example, if the electronic control unit determines that the vehicle has not entered the stop section, the electronic control unit controls the opening degree amount of the air flap with an opening degree amount which is determined by a map table established based on whether or not the vehicle enters the downtown travel section.

In addition, preferably, the electronic control unit controls the opening degree amount of the air flap to a fully open state when the engine coolant temperature is equal to or higher than a second reference coolant temperature that is higher than a first reference coolant temperature and enables determining that the engine is overheated.

In addition, if ambient air temperature is equal to or lower than a predetermined reference ambient air temperature, engine intake air temperature is equal to or lower than a predetermined reference intake air temperature, and engine coolant temperature is equal to or lower than a predetermined third reference coolant temperature, the electronic control unit controls the opening degree amount of the air flap to a fully closed state.

Other aspects and preferred embodiments of the invention are discussed infra.

With the system for controlling an air flap of a vehicle (e.g., a commercial bus) according to the present invention, it is possible to prevent hot air and noise of the engine of the vehicle from being transmitted to pedestrians waiting for the vehicle, e.g., at a bus stop.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 1 is a diagram showing a configuration of a system for controlling an air flap of a vehicle, according to the present invention.

FIGS. 2 to 8 are diagrams illustrating a map table in which opening degree amounts of an air flap are set according to each of parameters in the present invention.

Figures 1, 2, 3:
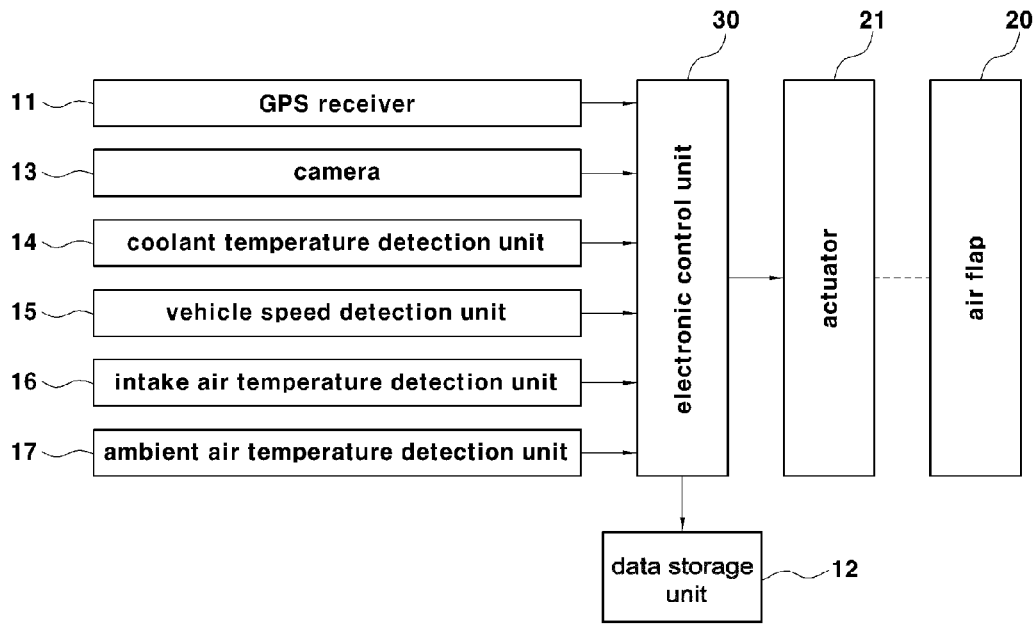

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the present invention will be described in detail such that those skilled in the art can easily implement the invention.

Reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

As shown in FIG. 1, a system for controlling an air flap of a vehicle according to the present invention comprises: a GPS receiver 11 mounted in the vehicle; a data storage unit 12; an imaging means 13; and an electronic control unit 30 for determining and controlling an opening degree amount (or an rotation angle) of an air flap 20 based on information received from the above-mentioned components.

The GPS receiver 11 receives GPS signals and is used in detecting location information of the vehicle.

The data storage unit 12 stores information of a specified travel route of the vehicle, i.e., stop sections specified according to a bus travel route and map information of a downtown travel section and it is used in determining whether or not the vehicle enters the stop sections and/or the downtown travel section.

For example, the stop sections may include all bus stops of the related bus travel route, and the downtown travel section may be set as a travel section involving the bus stops, where it is found that there are relatively a large number of pedestrians among bus stops of the related bus travel route.

The imaging means 13 is a camera mounted to a vehicle and is used in acquiring and providing image information at the vehicle stop sections, and determining whether or not a pedestrian is present at the stop section.

The imaging means 13 is supplied with electric power and turned on by the electronic control unit 30 that has determined that the vehicle enters a stop section, and acquires an image at the stop section when it is turned on.

The air flap 20 serves to vary an opening degree of openings for allowing air to flow into/discharge from an engine room in which an engine is mounted and to control an amount of the air flowing into/discharging from the engine room, wherein the air flap is rotatably installed to a lateral side of a vehicle body, rotated by motive power of an actuator 21, and adjusts the opening degree of the openings.

The actuator 21 operates the air flap 20 in response to a control signal output from the electronic control unit 30, and an opening degree amount and a resultant open amount of the air flap 20 are determined by the motive power of the actuator 21.

The electronic control unit 30 determines whether or not the vehicle enters the stop section and the downtown travel section based on vehicle location information detected from GPS signals acquired through the GPS receiver 11 and map information in the data storage unit 12; determines whether or not a pedestrian is present at the stop section based on image information of the imaging means 13; and then controls the opening degree amount of the air flap 20 when the vehicle enters the stop section, such that transmission of hot air and noise from the engine to the pedestrian at the stop section can be minimized.

In other words, if the electronic control unit 30 determines that the vehicle enters the stop section, it controls the opening degree amount of the air flap 20 in consideration of an opening degree amount which is set depending on whether or not the vehicle enters the stop section.

To this end, the opening degree amount of the air flap depending on whether or not the vehicle enters the stop section is set and stored as predetermined values in the electronic control unit 30. For example, as shown in FIG. 2, a map table for determining an opening degree amount of the air flap based on whether or not the vehicle enters the stop section is established and stored in the electronic control unit.

In addition, if the electronic control unit 30 determines that a pedestrian is present at the stop section, it controls the opening degree amount of the air flap 20 in consideration of an opening degree amount that is set depending on whether or not the pedestrian is present at the stop section.

To this end, the opening degree amount of the air flap depending on whether or not the pedestrian is present at the stop section is set and stored as predetermined values in the electronic control unit 30. For example, as shown in FIG. 3, a map table for determining an opening degree amount of the air flap based on whether or not the pedestrian is present at the stop section is established and stored in the electronic control unit.

In addition, the electronic control unit 30 controls the opening degree amount of the air flap 20 also in consideration of information such as engine coolant temperature, vehicle speed, engine intake air temperature, ambient air temperature (i.e., atmosphere temperature) and the like, as well as in consideration of whether or not the vehicle enters the stop section and whether or not the pedestrian is present at the stop section.

To this end, the electronic control unit 30 receives information of engine coolant temperature, vehicle speed, engine intake air temperature and ambient air temperature from a coolant temperature detection unit 14, a vehicle speed detection unit 15, an intake air temperature detection unit 16, and an ambient air temperature detection unit 17, respectively.

In addition, appropriate opening degree amounts of the air flap are set respectively according to the engine coolant temperature detected by the coolant temperature detection unit 14, the vehicle speed detected by the vehicle speed detection unit 15, the engine intake air temperature detected by the intake air temperature detection unit 16, and the ambient air temperature detected by the ambient air temperature detection unit 17 respectively, and stored in the electronic control unit 30. For example, as shown in FIGS. 4 to 7, map tables for determining the opening degree amount of the air flap are established based on engine coolant temperature, vehicle speed, engine intake air temperature, and ambient air temperature respectively, and stored in the electronic control unit.

Meanwhile, regarding the bus travel route, it can be classified as two types, i.e., one type is that the stop section is located at the center of the driving road and the other type is that the stop section is located at the roadside of the driving road. In a case where the stop section is located at the roadside of the driving road, hot air and noise from the engine may be transmitted to pedestrians even before the vehicle enters the stop section, i.e., even at any road sections except the stop section.

Accordingly, the electronic control unit 30 determines whether or not the vehicle enters the downtown travel section based on the vehicle location information and the map information in the data storage unit 12, and then, if it determines that the vehicle enters the downtown travel section, it controls the opening degree amount of the air flap 20 in consideration of an opening degree amount that is set depending on whether or not the vehicle enters the downtown travel section.

To this end, the opening degree amount of the air flap depending on whether or not the vehicle enters the downtown travel section is set as predetermined values, and stored in the electronic control unit 30. For example, as shown in FIG. 8, a map table for determining the opening degree amount of the air flap based on whether or not the vehicle enters the downtown travel section is established and stored in the electronic control unit.

In this connection, t the downtown travel section is, as mentioned above, set as a travel section involving bus stops where it is found that there are relatively a large number of pedestrians among bus stops (i.e., stop sections) of the related bus travel route.

Hereinafter, an exemplary method for controlling an air flap of the present invention based on the configuration as discussed above is described as follows:

When the electronic control unit 30 determines that the vehicle enters the stop section, it fixes the order of priority of parameters for determining the opening degree amount of the air flap in the order of engine coolant temperature, vehicle speed, and then existence or absence of a pedestrian at the stop section.

For example, the electronic control unit controls an opening degree amount of an air flap 20 with an opening degree amount determined by a map table established based on engine coolant temperature, when the engine coolant temperature is equal to or higher than a predetermined first reference coolant temperature; controls an opening degree amount of an air flap 20 with an opening degree amount determined by a map table established based on vehicle speed, when the engine coolant temperature is less than the predetermined first reference coolant temperature and the vehicle speed is equal to or lower than a predetermined reference vehicle speed; and controls an opening degree amount of an air flap 20 with an opening degree amount determined by a map table established based on whether or not a pedestrian is present at the stop section, when the engine coolant temperature is less than the predetermined first reference coolant temperature and the vehicle speed is higher than the predetermined reference vehicle speed.

Here, the first reference coolant temperature is a value of coolant temperature that enables determining that cooling of the engine is required, while the reference vehicle speed is a value of vehicle speed that is determined as the vehicle speed just before stopping.

In addition, if the electronic control unit 30 determines that the vehicle has not entered the stop section, it determines the opening degree amount of the air flap depending on whether or not the vehicle enters the downtown travel section.

In other words, when the vehicle has not entered the stop section, the electronic control unit 30 determines whether or not the vehicle enters the downtown travel section based on the vehicle location information and the map information in the data storage unit 12, and controls the opening degree amount of the air flap 20 with an opening degree amount that is determined by a map table established based on whether or not the vehicle enters the downtown travel section.

Furthermore, in order to establish a safe mode for protecting an engine, the electronic control unit 30 determines whether or not the engine is overheated and whether or not it is impossible to adjust the opening degree amount of the air flap, based on information of the engine coolant temperature, and then, if the engine coolant temperature is equal to or higher than a predetermined second reference coolant temperature, controls the opening degree amount to 100% unconditionally such that the air flap 20 is under a fully open state, irrespective of whether or not the vehicle enters the stop section.

In other words, if the engine coolant temperature is equal to or higher than the second reference coolant temperature that is higher than the first reference coolant temperature and enables determining that the engine has been overheated, the electronic control unit 30 controls the opening degree amount of the air flap 20 to 100% (i.e., fully open) in preference to all other conditions and parameters, and then maintains the fully open state of the air flap 20 until the engine coolant temperature falls down to a temperature value that is less than the second reference coolant temperature by a certain value or more.

In addition, since it is required to rapidly warm up the engine in cold weather (e.g., winter conditions) when ambient air temperature is low, if the ambient air temperature is equal to or lower than the predetermined reference ambient air temperature, the engine intake air temperature is equal to or lower than the predetermined reference intake air temperature, and the engine coolant temperature is equal to or lower than the predetermined third engine coolant temperature, the electronic control unit 30 controls the opening degree amount to 0% such that the air flap 20 is under a fully closed state, and accordingly air flowing into/discharging from the engine room is blocked, irrespective of whether or not the vehicle enters the stop section.

Here, the third reference coolant temperature is set as a value of coolant temperature that is lower than the first reference coolant temperature and requires to warm up the engine.

The invention has been described in detail with reference to preferred embodiments thereof. However, it will be appreciated by those skilled in the art that the scope of the present invention is not limited to the embodiments as mentioned above and that changes may be made in these embodiments without departing from the principles and spirit of the invention, the scope of which is defined in the appended claims and their equivalents.

What is claimed is:

1. A system for controlling an air flap of a vehicle, comprising:
   a GPS (Global Positioning System) receiver for receiving GPS signals;
   a data storage unit which stores map information of stop sections fixed in accordance with a specified travel route of the vehicle; and
   an electronic control unit for determining whether or not the vehicle enters a stop section based on vehicle location information detected from the GPS signals and the map information in the data storage unit and controlling an opening degree amount of an air flap in consideration of an opening degree amount which is set depending on whether or not the vehicle enters the stop section.

2. The system of claim 1, further comprising an imaging means for providing image information regarding whether or not a pedestrian is present at the stop section of the vehicle, wherein the electronic control unit controls the opening degree amount of the air flap in consideration an opening degree amount which is set depending on existence or absence of a pedestrian detected from the image information of the imaging means.

3. The system of claim 2, wherein if the electronic control unit determines that the vehicle enters into the stop section, the electronic control unit fixes an order of priority of parameters for determining the opening degree amount of the air flap in the order of engine coolant temperature, vehicle speed, and then existence or absence of a pedestrian at the stop section.

4. The system of claim 1, wherein the data storage unit stores map information of stop sections and also map information of a downtown travel section, and the electronic control unit determines whether or not the vehicle enters the downtown travel section based on the vehicle location information and the map information in the data storage unit.

5. The system of claim 4, wherein if the electronic control unit determines that the vehicle has not entered the stop section, the electronic control unit controls the opening degree amount of the air flap with an opening degree amount which is determined by a map table established based on whether or not the vehicle enters the downtown travel section.

6. The system of claim 1, wherein the electronic control unit controls the opening degree amount of the air flap to a fully open state when the engine coolant temperature is higher than a second reference coolant temperature that is higher than a first reference coolant temperature and enables determining that the engine is overheated.

7. The system of claim 1, wherein if ambient air temperature is equal to or lower than a predetermined reference ambient air temperature, intake air temperature of the engine is equal to or lower than a predetermined reference intake air temperature, and engine coolant temperature is equal to or lower than a predetermined third reference coolant temperature, the electronic control unit controls the opening degree amount of the air flap to a fully closed state.

* * * * *